United States Patent
Gotou et al.

(10) Patent No.: US 10,112,643 B2
(45) Date of Patent: Oct. 30, 2018

(54) ELECTRIC POWER STEERING DEVICE

(71) Applicant: KYB Corporation, Tokyo (JP)

(72) Inventors: Hiroyuki Gotou, Gifu (JP); Noboru Yoshida, Gifu (JP); Kenji Nishikubo, Gifu (JP); Yuichiro Okamoto, Hessen (DE); Kouichi Yamashina, Ann Arbor, MI (US)

(73) Assignee: KYB Corporation, Tokyo (JP)

( * ) Notice: Subject to any disclaimer, the term of this patent is extended or adjusted under 35 U.S.C. 154(b) by 74 days.

(21) Appl. No.: 15/115,908

(22) PCT Filed: Feb. 4, 2015

(86) PCT No.: PCT/JP2015/053088
§ 371 (c)(1),
(2) Date: Aug. 2, 2016

(87) PCT Pub. No.: WO2015/119148
PCT Pub. Date: Aug. 13, 2015

(65) Prior Publication Data
US 2017/0166247 A1    Jun. 15, 2017

(30) Foreign Application Priority Data
Feb. 4, 2014    (JP) .................. 2014-019415

(51) Int. Cl.
*B62D 5/04* (2006.01)
*B62D 15/02* (2006.01)

(52) U.S. Cl.
CPC ......... *B62D 5/0472* (2013.01); *B62D 5/0463* (2013.01); *B62D 15/021* (2013.01)

(58) Field of Classification Search
CPC ... B62D 5/0472; B62D 5/0463; B62D 15/021
See application file for complete search history.

(56) References Cited

U.S. PATENT DOCUMENTS 5,201,818 A * 4/1993 Nishimoto .......... B62D 5/0466
180/446
5,253,725 A * 10/1993 Nishimoto .......... B62D 5/0466
180/446

(Continued)

FOREIGN PATENT DOCUMENTS

CN    102666257 A    9/2012
JP    6-206550 A    7/1994

(Continued)

*Primary Examiner* — Frederick M Brushaber
(74) *Attorney, Agent, or Firm* — Hauptman Ham, LLP

(57) ABSTRACT

An electric power steering device includes a phase advance correction unit configured to advance a phase of a steering torque signal detected by a torque sensor detecting a steering torque input from a steering wheel, a specific frequency extraction unit configured to extract a component in a specific frequency band out of the steering torque signal detected by the torque sensor, a gain multiplication unit configured to correct a steering torque signal computed on the basis of an output signal of the phase advance correction unit and an output signal of the specific frequency extraction unit such that the steering torque signal reaches a limit value set by a limiter by multiplying the steering torque signal by a gain, and an addition unit configured to add an assist correction command value calculated on the basis of an output signal output from the gain multiplication unit to the assist command value.

12 Claims, 6 Drawing Sheets

(56) References Cited

U.S. PATENT DOCUMENTS

| | | | | |
|---|---|---|---|---|
| 5,699,249 | A | * | 12/1997 | Noro .................... B62D 5/0463 180/446 |
| 7,474,067 | B2 | * | 1/2009 | Ueda .................... B62D 5/0472 318/400.23 |
| 7,604,088 | B2 | * | 10/2009 | Nishizaki ................ B62D 6/10 180/444 |
| 7,826,950 | B2 | * | 11/2010 | Tamaizumi .......... B62D 5/0463 180/443 |
| 7,860,624 | B2 | * | 12/2010 | Kubota ................ B62D 5/0463 180/443 |
| 8,478,485 | B2 | * | 7/2013 | Nishimura .......... B62D 5/0493 180/446 |
| 8,594,892 | B2 | * | 11/2013 | Fujimoto ............. B62D 15/024 180/446 |
| 8,924,080 | B2 | * | 12/2014 | Oniwa .................... G05D 17/02 701/41 |
| 9,242,670 | B2 | * | 1/2016 | Endo .................... B62D 5/0466 |
| 9,809,247 | B2 | * | 11/2017 | Kleinau ................ B62D 5/0484 |
| 2009/0055049 | A1 | | 2/2009 | Sakaguchi et al. |
| 2012/0185132 | A1 | | 7/2012 | Kezobo et al. |

FOREIGN PATENT DOCUMENTS

| | | |
|---|---|---|
| JP | 2009-280163 A | 12/2009 |
| JP | 2011-25829 A | 2/2011 |
| WO | 2006/090639 A1 | 8/2006 |

\* cited by examiner

ELECTRIC POWER STEERING DEVICE

TECHNICAL FIELD

The present invention relates to an electric power steering device.

BACKGROUND ART

Vibration called flutter or shimmy may occur in a rotating direction of a steering wheel such as due to wheel balance during the travel of a vehicle.

JP1994-206550A discloses a device configured to predict the occurrence of vibration of a steering wheel on the basis of detection values of axial forces of tie rods and prevent the occurrence of vibration of the steering wheel by driving an actuator of a vibration conversion mechanism substantially simultaneously with the occurrence of vibration of the steering wheel to supply oil in an accumulator to an oil chamber of a shaft.

SUMMARY OF INVENTION

In a technology described in JP1994-206550A, the axial forces of the tie rods need to be detected and the structure of the vibration conversion mechanism for preventing the occurrence of vibration of the steering wheel is complicated. Thus, it is hard to say that vibration generated in the steering wheel is easily prevented.

The present invention aims to suppress vibration generated in a steering wheel by a simple method.

According to one aspect of the present invention, an electric power steering device for driving an electric motor using an assist command value calculated on the basis of a detection result of a torque sensor for detecting a steering torque input from a steering wheel is provided. The electric power steering device includes a phase advance correction unit configured to advance a phase of a steering torque signal detected by the torque sensor; a specific frequency extraction unit configured to extract a component in a specific frequency band out of the steering torque signal detected by the torque sensor; a gain multiplication unit configured to correct a steering torque signal computed on the basis of an output signal of the phase advance correction unit and an output signal of the specific frequency extraction unit such that the steering torque signal reaches a limit value set by a limiter by multiplying the steering torque signal by a gain; and an addition unit configured to add an assist correction command value calculated on the basis of an output signal output from the gain multiplication unit to the assist command value.

DESCRIPTION OF EMBODIMENTS

Figure 1:
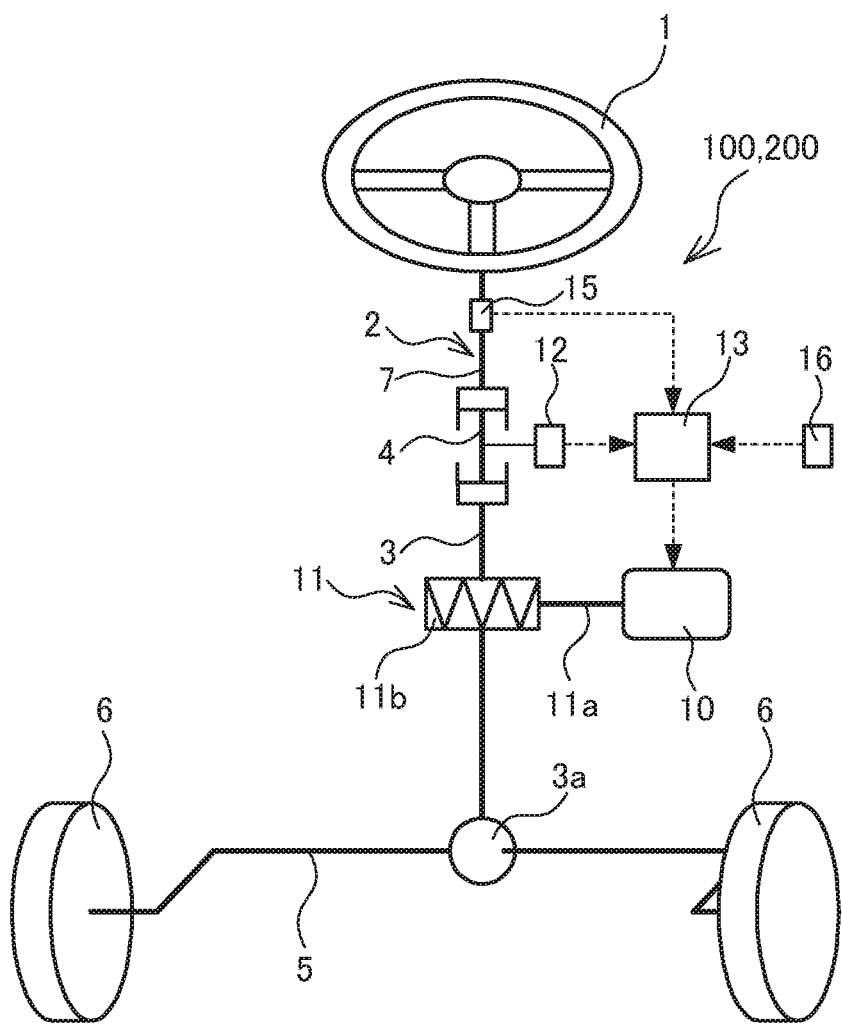
FIG. 1 is a configuration diagram of electric power steering devices according to the first and the second embodiments of the present invention.

Hereinafter, embodiments of the present invention are described with reference to the drawings.

First Embodiment

An electric power steering device 100 according to a first embodiment of the present invention is described with reference to FIGS. 1 to 4. First, the overall configuration of the electric power steering device 100 is described with reference to FIG. 1.

The electric power steering device 100 includes an input shaft 7 configured to rotate as a steering wheel 1 is operated by a driver, an output shaft 3 having a lower end linked to a rack shaft 5 and a torsion bar 4 coupling the input shaft 7 and the output shaft 3. The electric power steering device 100 turns wheels 6 by moving the rack shaft 5 meshed with a pinion 3a provided on the lower end of the output shaft 3 in an axial direction. A steering shaft 2 is configured by the input shaft 7 and the output shaft 3.

The electric power steering device 100 further includes an electric motor 10 as a drive source for assisting the steering of the steering wheel 1 by the driver, a speed reducer 11 for transmitting the rotation of the electric motor 10 to the steering shaft 2 while decelerating it, a torque sensor 12 for detecting a steering torque input from the steering wheel 1 and a controller 13 for controlling the drive of the electric motor 10 on the basis of a detection result of the torque sensor 12.

The speed reducer 11 is composed of a worm shaft 11a coupled to an output shaft of the electric motor 10 and a worm wheel 11b coupled to the output shaft 3 and meshed with the worm shaft 11a. A torque output by the electric motor 10 is transmitted to the worm wheel 11b from the worm shaft 11a and applied as an assist torque to the output shaft 3.

The torque sensor 12 detects the steering torque applied to the torsion bar 4 on the basis of the relative rotation of the input shaft 7 and the output shaft 3. The torque sensor 12 outputs a voltage signal corresponding to the detected steering torque to the controller 13. The controller 13 calculates a torque output by the electric motor 10 on the basis of the voltage signal from the torque sensor 12 and controls the drive of the electric motor 10 to generate the calculated torque. In this way, the electric power steering device 100 drives the electric motor 10 on the basis of a detection result of the torque sensor 12 for detecting the steering torque input from the steering wheel 1 and assists the steering of the steering wheel 1 by the driver.

The steering shaft 2 is provided with a steering angle sensor 15 serving as a steering angle detector for detecting a steering angle (absolute steering angle) of the steering wheel 1. A detection result of the steering angle sensor 15 is output to the controller 13. The steering angle sensor 15 outputs 0° as a steering angle if the steering wheel 1 is at a neutral position. Further, a steering angle with a (+) sign is output according to the rotation of the steering wheel 1 if the steering wheel 1 is steered rightward from the neutral position, whereas a steering angle with a (−) sign is output according to the rotation of the steering wheel 1 if the steering wheel 1 is steered leftward from the neutral position.

A detection result of a vehicle speed sensor 16 serving as a vehicle speed detector for detecting a vehicle speed is input to the controller 13.

The controller 13 includes a CPU for controlling the operation of the electric motor 10, a ROM storing control programs, set values and the like necessary for the processing operation of the CPU and a RAM for temporarily storing information detected by various sensors such as the torque sensor 12, the steering angle sensor 15 and the vehicle speed sensor 16.

Here, vibration input to the rack shaft 5 through the wheels 6 from a road surface and a natural vibration frequency of a side above the torsion bar 4 may match and resonate and vibration called flutter or shimmy may be generated in the steering wheel 1 particularly during high-speed travel (e.g. 70 to 150 km/h) of a vehicle. In the electric power steering device 100, a control is executed to suppress this vibration of the steering wheel 1.

Next, the control for suppressing the vibration of the steering wheel 1, specifically a control of the electric motor 10 by the controller 13 is described with reference to FIGS. 2 to 4.

Figure 2:
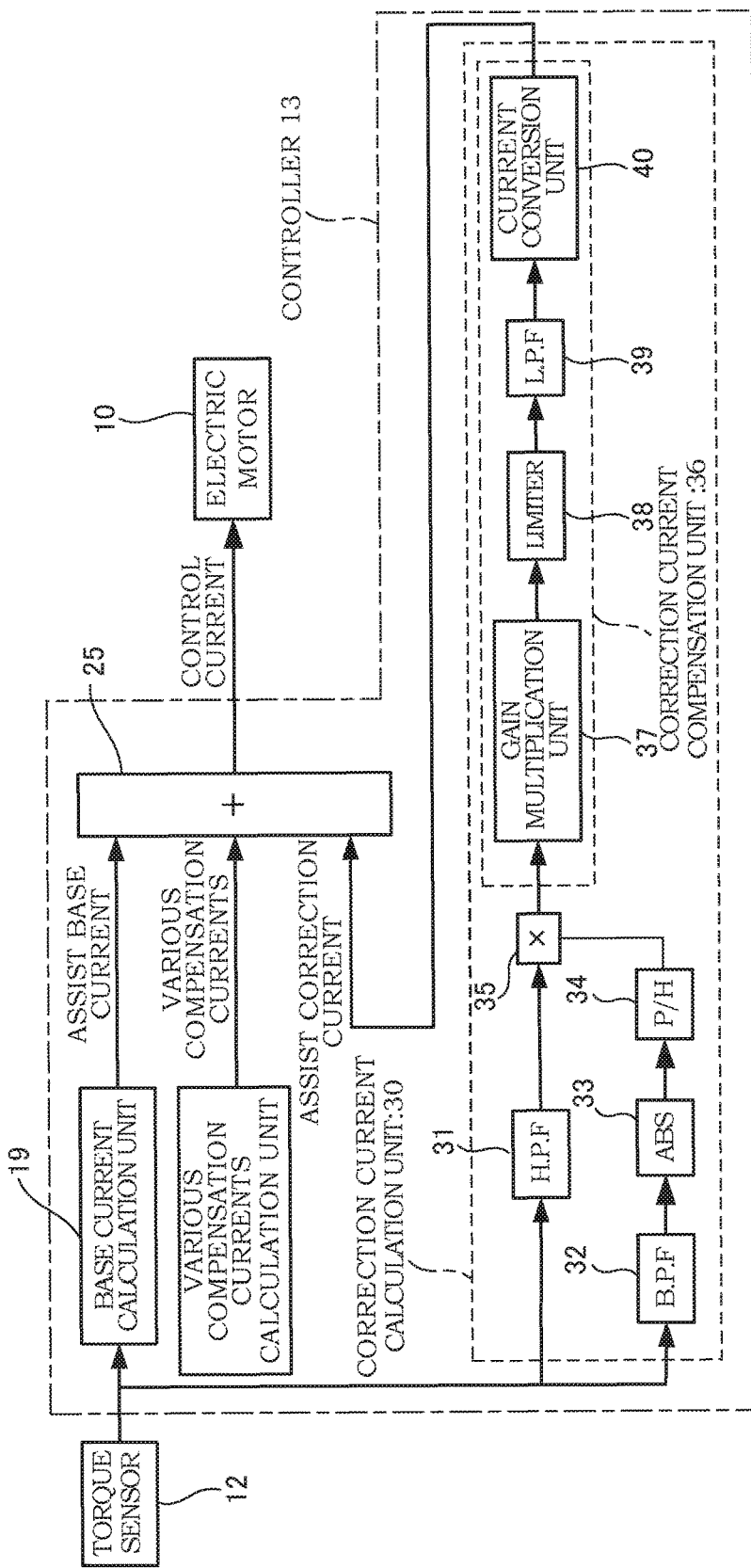
FIG. 2 is a control block diagram of the electric power steering device according to the first embodiment of the present invention.

As shown in FIG. 2, the controller 13 includes a base current calculation unit 19 for calculating an assist base current (assist command value) for assisting the steering of the steering wheel 1 by the driver on the basis of the detection result of the torque sensor 12.

The controller 13 further includes a correction current calculation unit 30 for calculating an assist correction current (assist correction command value) for suppressing the vibration of the steering wheel 1. The assist correction current is added to the assist base current by an addition unit 25.

In the addition unit 25, various compensation currents for compensating for the friction of gears and the like are also added besides the assist base current and the assist correction current and the resulting current is output to the electric motor 10 as a control current for controlling the drive of the electric motor 10.

As described above, the electric motor 10 is controlled by the control current obtained by adding the assist correction current for suppressing the vibration of the steering wheel 1 to the assist base current for assisting the steering of the steering wheel 1 by the driver.

The correction current computation unit 30 is described below.

The correction current computation unit 30 includes a high-pass filter (HPF) 31 serving as a phase advance correction unit for advancing a phase of a steering torque signal detected by the torque sensor 12 and a band-pass filter (BPF) 32 serving as a specific frequency extraction unit for extracting a component in a specific frequency band out of the steering torque signal detected by the torque sensor 12.

The component in the specific frequency band extracted by the band-pass filter 32 is a steering torque signal in a band of 10 to 20 Hz, which is a vibration component of the steering wheel 1. The frequency component extracted by the band-pass filter 32 is converted into an absolute value by an absolute value calculation unit (ABS) 33. The absolute value calculated by the absolute value calculation unit 33 is output to a peak hold unit (P/H) 34. The peak hold unit 34 detects a peak value of the absolute value calculated by the absolute value calculation unit 33 and processes the peak value such that the peak vale decreases only by a fixed value for a fixed period. That is, the peak hold unit 34 processes the peak value of the absolute value calculated by the absolute value calculation unit 33 such that the peak value does not decrease for the fixed period.

The steering torque signal output from the high-pass filter 31 and the steering torque signal output from the peak hold unit 34 are multiplied by a multiplication unit 35. A steering torque signal output from the multiplication unit 35 is the product of the signals respectively processed by the high-pass filter 31 and the band-pass filter 32. Therefore, a phase of the steering torque signal output from the multiplication unit 35 is advanced from that of the steering torque signal output from the torque sensor 12, and components other than the vibration component of the steering wheel 1 are removed in the steering torque signal output from the multiplication unit 35. Thus, an assist torque output from the electric motor 10 by the assist correction current calculated on the basis of the steering torque signal output from the multiplication unit 35 acts in a direction to cancel vibration input to the rack shaft 5 from a road surface through the wheels 6. That is, the assist correction current acts to suppress the vibration of the steering wheel 1.

Figure 3:
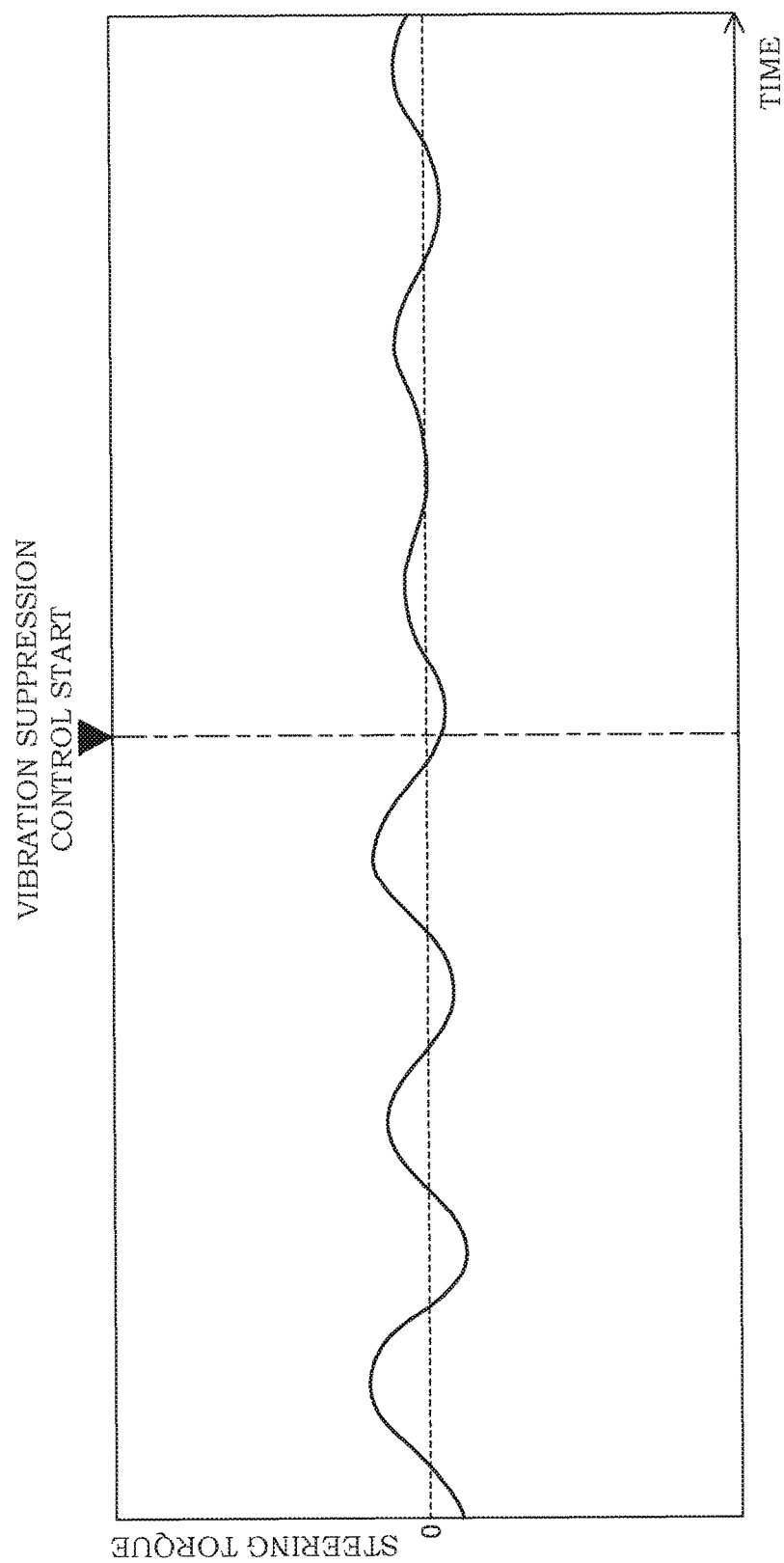
FIG. 3 is a chart showing a steering torque signal output from a torque sensor.
Figure 4:
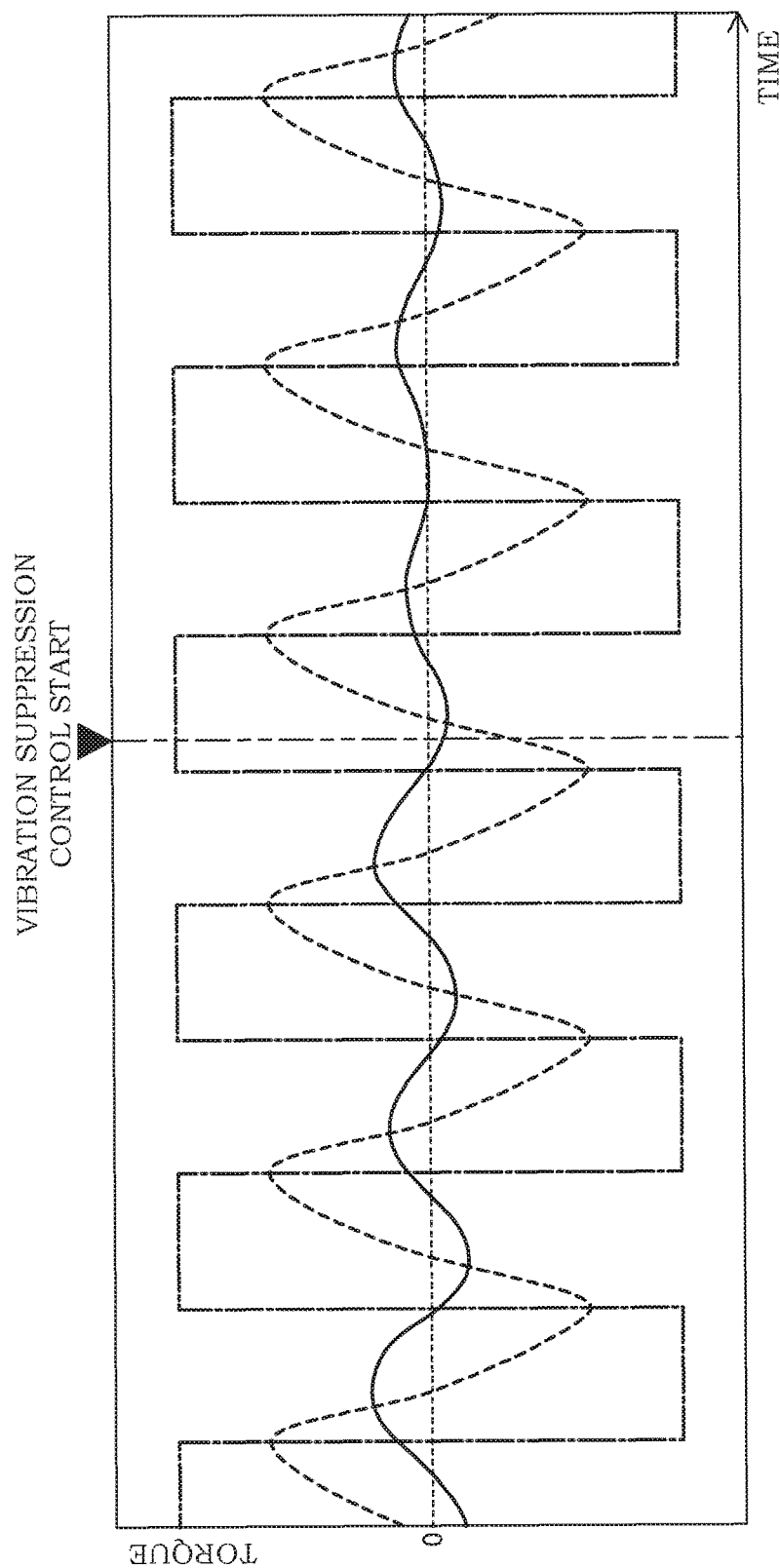
FIG. 4 is a chart showing the steering torque signal output from the torque sensor, a rectangular wave output from a limiter and a sine wave converted by a waveform conversion unit.

FIG. 3 shows the steering torque signal output from the torque sensor 12. In FIG. 3, a horizontal axis represents time and a vertical axis represents the steering torque. A "vibration suppression control start" position shown in FIG. 3 is a position where the addition of the assist correction current to the assist base current is started.

Since the assist torque output by the electric motor 10 acts in the direction to cancel the vibration input to the rack shaft 5 by executing a vibration suppression control, the steering torque detected by the torque sensor 12 is attenuated as shown in FIG. 3. That is, the vibration of the steering wheel 1 is suppressed.

However, by the attenuation of the steering torque detected by the torque sensor 12, a steering torque signal (feedback signal) to be input to the high-pass filter 31 and the band-pass filter 32 also becomes smaller. Thus, the assist correction current calculated on the basis of the steering torque signal output from the multiplication unit 35 becomes smaller and, if the vibration of the steering wheel 1 continues, the vibration of the steering wheel 1 increases again. As just described, the assist correction current is also be attenuated by the attenuation of the steering torque detected by the torque sensor 12, wherefore it may not be possible to effectively suppress the vibration of the steering wheel 1.

As a measure against this, the correction current computation unit 30 includes a correction current compensation unit 36 for preventing the attenuation of the assist correction current even if the steering torque is attenuated.

The correction current compensation unit 36 is described with reference to FIGS. 2 and 4.

The correction current compensation unit 36 includes a gain multiplication unit 37 for multiplying the steering torque signal output from the multiplication unit 35 by a gain, a limiter 38 for limiting upper and lower limit values of the steering torque signal, a low-pass filter 39 serving as a waveform conversion unit for converting a rectangular wave output from the limiter 38 into a sine wave and a current conversion unit 40 for converting an output signal of the low-pass filter 39 into a current. FIG. 4 shows the steering torque signal output from the torque sensor 12 by solid line, the rectangular wave output from the limiter 38 by dashed-dotted line and the sine wave converted by the low-pass filter 39 by dotted line. In FIG. 4, a horizontal axis represents time and a vertical axis represents a torque value.

In the gain multiplication unit 37, the steering torque signal is multiplied by the gain such that the upper and lower limit values of the steering torque signal are corrected to reach a limit value (absolute value) set by the limiter 38. Thus, as shown by dashed-dotted line in FIG. 4, upper and lower limit values of the rectangular wave output from the limiter 38 are fixed values limited by the limiter 38 regardless of the magnitude of the steering torque signal (solid line in FIG. 4) output from the torque sensor 12.

Since the steering torque signal output from the limiter 38 is the rectangular wave, steering feeling of the steering wheel 1 may be deteriorated if the electric motor 10 is controlled by the assist correction current calculated on the basis of this rectangular wave. Accordingly, the steering torque signal of the rectangular wave output from the limiter 38 is converted into a sine wave by the low-pass filter 39. This prevents the deterioration of steering feeling. As shown by dotted line in FIG. 4, the steering torque signal output from the low-pass filter 39 changes with a fixed amplitude regardless of the magnitude of the steering torque signal (solid line in FIG. 4) output from the torque sensor 12. It should be noted that the steering torque signal output from the low-pass filter 39 shown by dotted line in FIG. 4 is advanced in phase as compared to the steering torque signal output from the torque sensor 12 shown by solid line in FIG. 4 by the action of the high-pass filter 31.

The steering torque signal output from the low-pass filter 39 is added as the assist correction current to the assist base current by the addition unit 25 after being converted into a current by the current conversion unit 40.

As described above, the assist correction current output to the addition unit 25 is compensated not to be attenuated by the correction current compensation unit 36 even if the steering torque signal output from the torque sensor 12 is attenuated. Thus, even if the steering torque signal output from the torque sensor 12 is attenuated, the assist torque, the electric motor 10 outputs by the assist correction current, is caused to continuously act with a fixed magnitude in a direction to cancel the vibration input to the rack shaft 5. Therefore, the vibration of the steering wheel 1 is effectively suppressed.

According to the above first embodiment, the following effects are exhibited.

Since the assist correction current calculated on the basis of the steering torque signal output from the high-pass filter 31 and the steering torque signal output from the band-pass filter 32 is added to the assist base current for driving the electric motor 10, the electric motor 10 generates an assist torque in the direction to cancel the vibration of the steering wheel 1. Further, since the assist correction current is compensated not to be attenuated by the correction current compensation unit 36 even if the steering torque signal output from the torque sensor 12 is attenuated, the assist torque, the electric motor 10 outputs by the assist correction current, is caused to continuously act with a fixed magnitude in the direction to cancel the vibration input to the rack shaft 5. Thus, the vibration generated in the steering wheel 1 can be effectively suppressed by a simple method.

Second Embodiment

Next, an electric power steering device 200 according to a second embodiment of the present invention is described with reference to FIGS. 1 and 5. Points of difference from the electric power steering device 100 according to the above first embodiment are described below. In the electric power steering device 200, the same constituent parts as the electric power steering device 100 according to the above first embodiment are denoted by the same reference signs in FIG. 5 and not described.

The electric power steering device 200 differs from the electric power steering device 100 according to the above first embodiment in that an addition unit 25 performs an addition processing of adding an assist correction current to an assist base current only when a prescribed execution condition is satisfied. The prescribed execution condition is described in detail below.

The electric power steering device 200 includes a vehicle speed determination unit 50 for determining whether or not a vehicle speed detected by a vehicle speed sensor 16 is within a predetermined prescribed range and a steering speed determination unit 51 for determining whether or not a steering speed calculated from the steering angle detected by the steering angle sensor 15 is equal to or less than a predetermined prescribed speed. The vehicle speed determination unit 50 and the steering speed determination unit 51 correspond to an execution condition determination unit for determining whether or not the execution condition of the addition processing in the addition unit 25 is satisfied.

If the vehicle speed is determined to be within the prescribed range by the vehicle speed determination unit 50 and the steering speed is determined to be equal to or less than the prescribed speed by the steering speed determination unit 51, the assist correction current is added to the assist base current by a switcher 52. On the other hand, if the vehicle speed is determined to be outside the prescribed range by the vehicle speed determination unit 50 or the steering speed is determined to be more than the prescribed speed by the steering speed determination unit 51, 0 A is added to the assist base current by the switcher 52. That is, the assist correction current is not added to the assist base current.

As just described, in the electric power steering device 200, the vehicle speed and the steering speed are monitored, and the assist correction current is added to the assist base current and a vibration suppression control of a steering wheel 1 is executed only when the vehicle speed and the steering speed satisfy the prescribed execution conditions. The vehicle speed is monitored because the vibration of the steering wheel 1 often occurs particularly during high-speed travel of a vehicle. Thus, the vibration suppression control of the steering wheel 1 is executed only during high-speed travel of the vehicle. Accordingly, the prescribed range is set, for example, at 70 to 150 km/h. It should be noted that the vibration of the steering wheel 1 is not a phenomenon which occurs only during high-speed travel of the vehicle, but notably occurs during high-speed travel and also occurs during low-speed travel. Further, the steering speed is monitored because the vibration of the steering wheel 1 is less likely to occur when the steering wheel 1 is turned and likely to occur when steering is held. That is, the vibration of the steering wheel 1 is less likely to occur when the steering wheel 1 is firmly grabbed and likely to occur when the steering wheel 1 is lightly grabbed. Therefore, if the steering speed is equal to or less than the prescribed speed, e.g. equal to or less than 10 deg/s, it is determined that the steering wheel 1 is held and the vibration suppression control of the steering wheel 1 is executed.

A case where both the vehicle speed and the steering speed are monitored and the vibration suppression control of the steering wheel 1 is executed when the conditions are simultaneously satisfied in the vehicle speed determination unit 50 and the steering speed determination unit 51 is described above. However, instead of this, the vibration suppression control of the steering wheel 1 may be executed if the condition is satisfied in either one of the vehicle speed determination unit 50 and the steering speed determination unit 51.

Next, a modification of this second embodiment is described with reference to FIG. 6.

Figure 5:
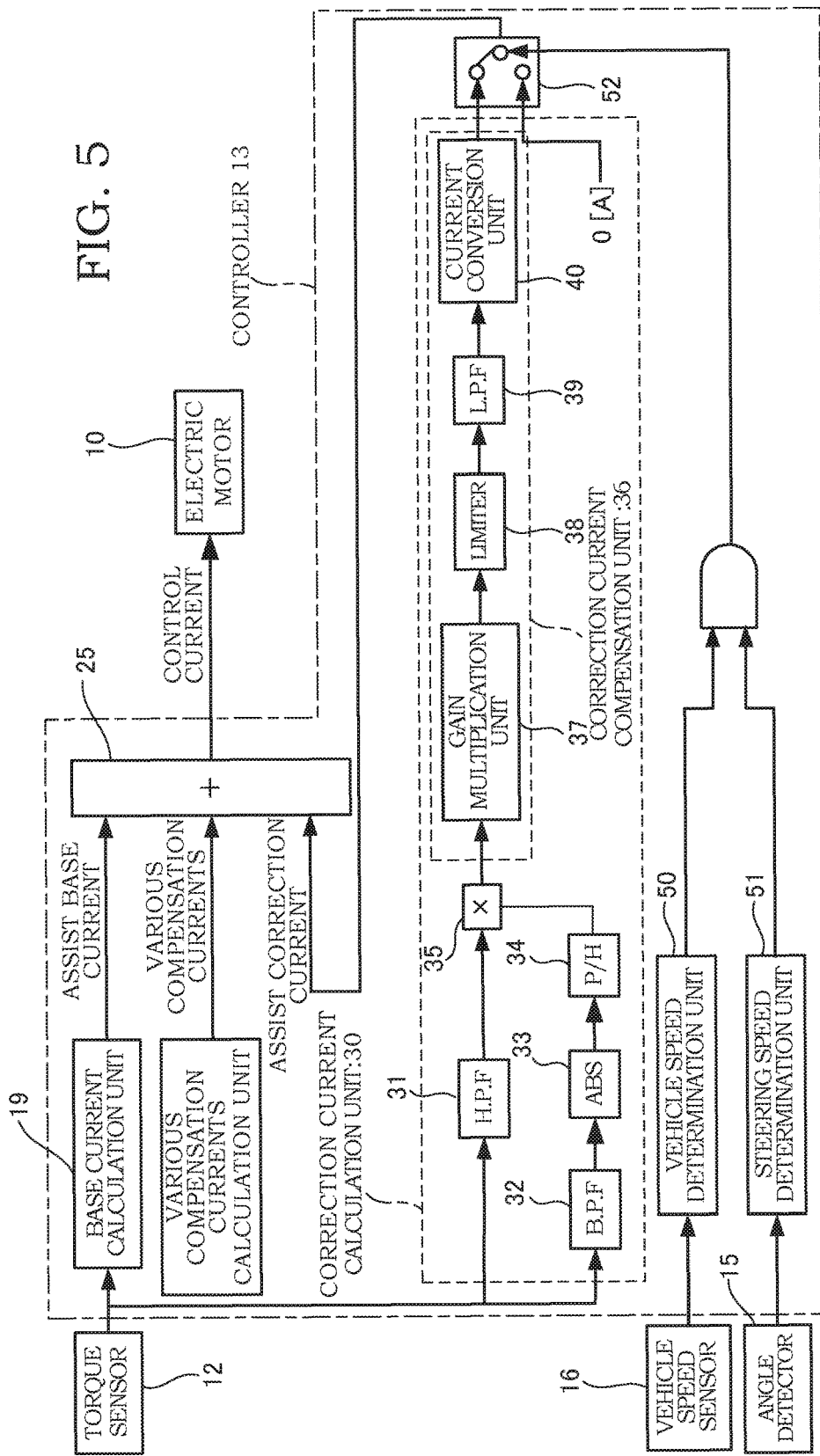
FIG. 5 is a control block diagram of the electric power steering device according to the second embodiment of the present invention.
Figure 6:
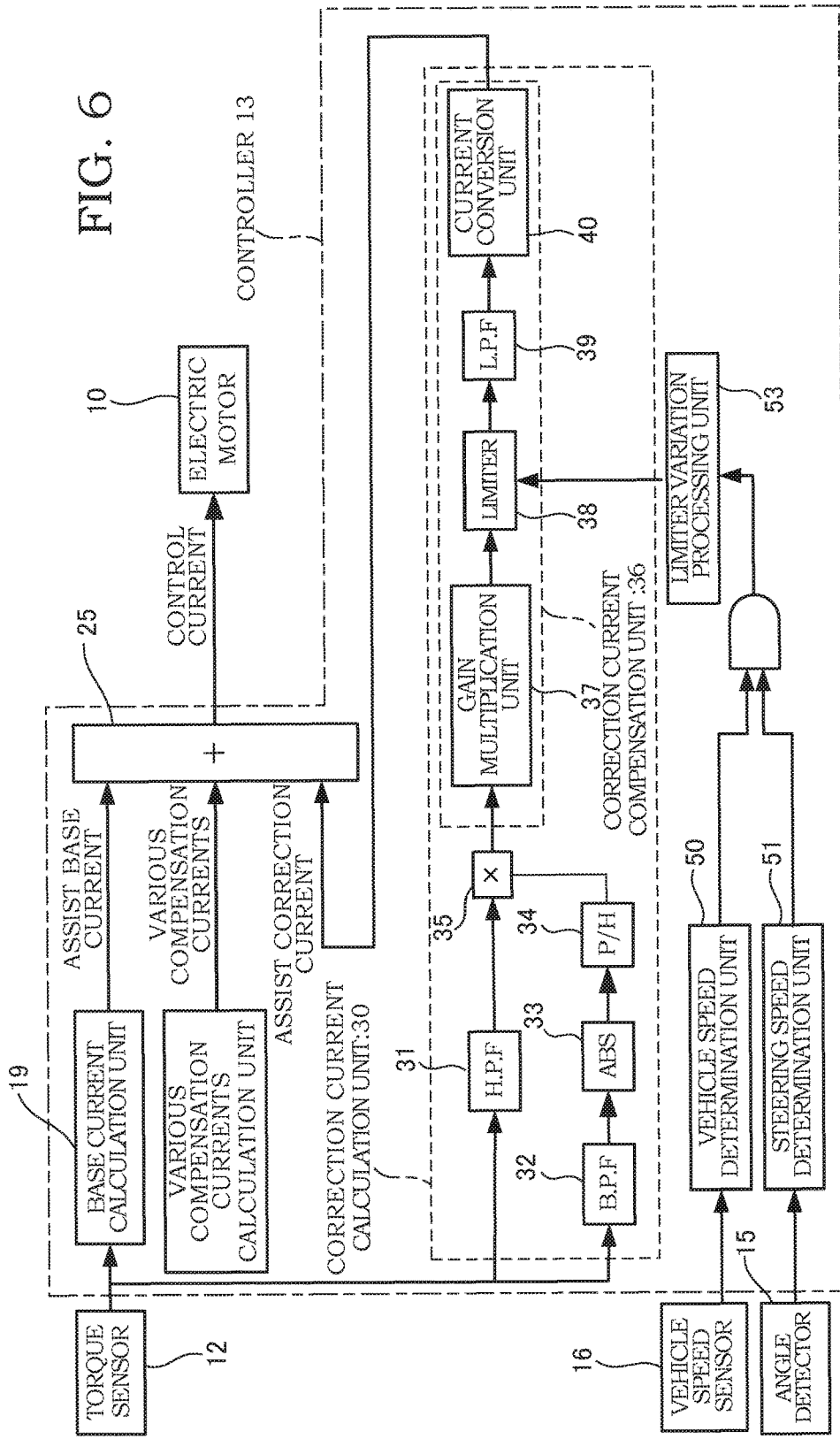
FIG. 6 is a control block diagram of an electric power steering device according to a modification of the second embodiment of the present invention.

As shown in FIG. 6, in the present modification, a limiter variation processing unit 53 for making a limit value set by a limiter 38 variable is provided instead of the switcher 52 shown in FIG. 5

The limiter variation processing unit 53 gradually increases and decreases the limit value set by the limiter 38 on the basis of a determination result of the execution condition determination unit composed of the vehicle speed determination unit 50 and the steering speed determination unit 51. Specifically, the limiter variation processing unit 53 gradually increases the limit value set by the limiter 38 from 0 Nm to a prescribed upper limit value when the execution condition is switched from a unsatisfied state to a satisfied state in the execution condition determination unit, i.e. when the vehicle speed is determined to be within the prescribed range by the vehicle speed determination unit 50 and the steering speed is determined to be equal to or less than the prescribed speed by the steering speed determination unit 51 from a state where the vehicle speed is determined to be outside the prescribed range by the vehicle speed determination unit 50 or the steering speed is determined to be more than the prescribed speed by the steering speed determination unit 51. Since an output signal output from a gain multiplication unit 37 through the limiter 38 gradually increases from 0 Nm to the upper limit value in this way, the assist correction current gradually increases. On the other hand, the limiter variation processing unit 53 gradually decreases the limit value set by the limiter 38 from the upper limit value to 0 Nm when the execution condition is switched from the satisfied state to the unsatisfied state in the execution condition determination unit, i.e. when the vehicle speed is determined to be outside the prescribed range by the vehicle speed determination unit 50 or the steering speed is determined to be more than the prescribed speed by the steering speed determination unit 51 from a state where the vehicle speed is determined to be within the prescribed range by the vehicle speed determination unit 50 and the steering speed is determined to be equal to or less than the prescribed speed by the steering speed determination unit 51. Since the output signal output from the gain multiplication unit 37 through the limiter 38 gradually decreases from the upper limit value to 0 Nm in this way, the assist correction current gradually decreases.

As just described, the limit value set by the limiter 38 is gradually increased and decreased by the limiter variation processing unit 53 when the execution condition is switched from the unsatisfied state to the satisfied state or the execution condition is switched from the satisfied state to the unsatisfied state in the execution condition determination unit composed of the vehicle speed determination unit 50 and the steering speed determination unit 51. Thus, the assist correction current can be smoothly changed. Therefore, the operation of the electric motor 10 can be smoothed.

A time for gradually increasing the limit value set by the limiter 38 from 0 Nm to the upper limit value and a time for gradually decreasing it from the upper limit value to 0 Nm may be equal or different.

Further, the switcher 52 shown in FIG. 5 and the limiter variation processing unit 53 shown in FIG. 6 may be used in combination. Specifically, the limit value set by the limiter 38 may be gradually increased from 0 Nm to the upper limit value by the limiter variation processing unit 53 when the execution condition is switched from the unsatisfied state to the satisfied state in the execution condition determination unit, whereas 0 A may be added to the assist base current by the switcher 52 when the execution condition is switched from the satisfied state to the unsatisfied state in the execution condition determination unit. Further, the assist correction current may be added to the assist base current by the switcher 52 when the execution condition is switched from the unsatisfied state to the satisfied state in the execution condition determination unit, whereas the limit value set by the limiter 38 may be gradually decreased from the upper limit value to 0 Nm by the limiter variation processing unit 53 when the execution condition is switched from the satisfied state to the unsatisfied state in the execution condition determination unit.

Embodiments of this invention were described above, but the above embodiments are merely examples of applications of this invention, and the technical scope of this invention is not limited to the specific constitutions of the above embodiments.

This application claims priority based on Japanese Patent Application No. 2014-019415 filed with the Japan Patent Office on Feb. 4, 2014, the entire contents of which are incorporated into this specification.

The invention claimed is:

1. An electric power steering device for driving an electric motor using an assist command value calculated on the basis of a detection result of a torque sensor for detecting a steering torque input from a steering wheel, comprising:
    a phase advance correction unit configured to advance a phase of a steering torque signal detected by the torque sensor;
    a specific frequency extraction unit configured to extract a component in a specific frequency band out of the steering torque signal detected by the torque sensor;
    a gain multiplication unit configured to correct a steering torque signal computed on the basis of an output signal of the phase advance correction unit and an output signal of the specific frequency extraction unit such that the steering torque signal reaches a limit value set by a limiter by multiplying the steering torque signal by a gain; and
    an addition unit configured to add an assist correction command value calculated on the basis of an output signal output from the gain multiplication unit to the assist command value.

2. The electric power steering device according to claim 1, further comprising:
    a waveform conversion unit configured to convert an output signal of a rectangular wave output from the limiter into a sine wave.

3. The electric power steering device according to claim 1, further comprising:
    an execution condition determination unit configured to determine whether or not an execution condition of executing an addition processing in the addition unit is satisfied.

4. The electric power steering device according to claim 3, further comprising:
    a vehicle speed determination unit configured to determine whether or not a vehicle speed is within a predetermined prescribed range, wherein:
    the execution condition determination unit determines that the execution condition is satisfied when the vehicle speed is determined to be within the prescribed range by the vehicle speed determination unit.

5. The electric power steering device according to claim 4, further comprising:
   a steering angle detector configured to detect a steering angle of the steering wheel; and
   a steering speed determination unit configured to determine whether or not a steering speed calculated from the steering angle detected by the steering angle detector is equal to or less than a predetermined prescribed speed, wherein:
   the execution condition determination unit determines that the execution condition is satisfied when the steering speed is determined to be equal to or less than the prescribed speed by the steering speed determination unit.

6. The electric power steering device according to claim 3, further comprising:
   a steering angle detector configured to detect a steering angle of the steering wheel; and
   a steering speed determination unit configured to determine whether or not a steering speed calculated from the steering angle detected by the steering angle detector is equal to or less than a predetermined prescribed speed, wherein:
   the execution condition determination unit determines that the execution condition is satisfied when the steering speed is determined to be equal to or less than the prescribed speed by the steering speed determination unit.

7. The electric power steering device according to claim 3, further comprising:
   a limiter variation processing unit configured to make the limit value set by the limiter variable, wherein:
   the limiter variation processing unit gradually increases and decreases the limit value on the basis of a determination result of the execution condition determination unit.

8. The electric power steering device according to claim 7, wherein:
   the limiter variation processing unit gradually increases the limit value when the execution condition is switched from a unsatisfied state to a satisfied state in the execution condition determination unit.

9. The electric power steering device according to claim 8, wherein:
   the limiter variation processing unit gradually decreases the limit value when the execution condition is switched from a satisfied state to a unsatisfied state in the execution condition determination unit.

10. The electric power steering device according to claim 7, wherein:
    the limiter variation processing unit gradually decreases the limit value when the execution condition is switched from a satisfied state to a unsatisfied state in the execution condition determination unit.

11. The electric power steering device according to claim 1, wherein:
    the gain multiplication unit calculates the steering torque signal on the basis of the output signal of the phase advance correction unit and an output signal processed such that the output signal of the specific frequency extraction unit is converted into absolute values and peak values of the absolute values do not decrease for a fixed period.

12. The electric power steering device according to claim 1, wherein:
    the component in the specific frequency band extracted by the specific extraction unit is a vibration component of the steering wheel.

* * * * *